United States Patent
Watanabe (10) Patent No.: US 7,587,140 B2
(45) Date of Patent: Sep. 8, 2009

(54) OPTICAL TIME-DIVISION DEMULTIPLEXING APPARATUS

(75) Inventor: Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 590 days.

(21) Appl. No.: 10/724,724

(22) Filed: Dec. 2, 2003

(65) Prior Publication Data

US 2004/0109695 A1 Jun. 10, 2004

(30) Foreign Application Priority Data

Dec. 6, 2002 (JP) .............................. 2002-355681

(51) Int. Cl.
*H04J 14/08* (2006.01)

(52) U.S. Cl. ...................... 398/101; 398/102

(58) Field of Classification Search .......... 398/101–102
See application file for complete search history.

(56) References Cited

U.S. PATENT DOCUMENTS

| 5,401,957 | A | * | 3/1995 | Suzuki et al. ........... 250/227.21 |
| 6,141,129 | A | * | 10/2000 | Mamyshev ................ 398/180 |
| 6,608,854 | B1 | | 8/2003 | Watanabe |
| 7,027,466 | B1 | * | 4/2006 | Ozeki ........................ 370/533 |

FOREIGN PATENT DOCUMENTS

| EP | 1 263 156 A1 | 12/2002 |
| JP | 7-131441 | 5/1995 |
| JP | 8-101412 | 4/1996 |
| JP | 08-195732 | 7/1996 |
| JP | 2000-321606 | 11/2000 |
| JP | 2000-323786 | 11/2000 |
| JP | 2001-27769 | 1/2001 |
| JP | 2001-069080 | 3/2001 |
| JP | 2001-117125 | 4/2001 |
| JP | 2001-222037 | 8/2001 |
| JP | 2001-249371 | 9/2001 |
| JP | 2002-23208 | 1/2002 |
| JP | 2002-77052 | 3/2002 |

OTHER PUBLICATIONS

Bjarklev, A. et al. "Photonic Crystal Fibres—the State-of-the-Art." 28th European Conference on Optical Communication, 2002. ECOC 2002. Sep. 8-12, 2002: 1-2.*

(Continued)

*Primary Examiner*—Leslie Pascal
(74) *Attorney, Agent, or Firm*—Staas & Halsey LLP (57) ABSTRACT

Amplitude modulation is performed for a signal light with a modulation signal having the same cycle as that of an optical pulse to be extracted by using an optical modulator. At this time, timing is adjusted so that the peak of the optical pulse of the channel to be extracted of the signal light becomes the largest. A spectrum of the amplitude-modulated signal light is expanded according to the size of the peak of the optical pulse by a spectrum expander. Then, part of the expanded spectrum is extracted with a band pass filter, whereby the optical pulse of the desired channel is extracted.

18 Claims, 6 Drawing Sheets

OTHER PUBLICATIONS

Hansryd, J. et al. "O-TDM demultiplexer with 40-dB gain based on a fiber optical parametric amplifier." IEEE Photonics Technology Letters, vol. 13, No. 7: 732-734.*

Okuno, T. et al. "Silica-based functional fibers with enhanced nonlinearity and their applications." IEEE Journal of Selected Topics in Quantum Electronics, vol. 5, No. 5, Sep./Oct. 1999: 1385-1391.*

Phillips, I.D. et al. "Drop and insert multiplexing with simultaneous clock recovery using an electroabsorption modulator." IEEE Photonics Technology Letters, vol. 10, No. 2, Feb. 1998: 291-293.*

Takahashi, Y. et al. "Applications of Electroabsorption Modulators to Soliton Transmission." Optoelectronics—Devices and Technologies, vol. 10, No. 4, Dec. 1995: 543-560.*

F. Futami et al., "All-Optical Data Addition to a Time Slot in 160-Gb/s OTDM Signal Using Wavelength Conversion by Supercontinuum in a Nonlinear Fiber", Optical Communication 2001, vol. 3, Sep. 2001 pp. 306-307.

T. J. Xia et al., "Novel Self-Synchronization Scheme for High-Speed Packet TDM Networks", IEEE Photonics Technology Letters, vol. 11, No. 2, Feb. 1999; pp. 269-271.

L. Rau et al., "All-Optical Add-Drop of an OTDM Channel Using an Ultrafast Fiber Based on Wavelength Converter", Optical Fiber Comm. Conf. and Exhibit, Technical Digest, Postconference; Trends in Optics and Photonics Series, vol. 70, pp. 259-261.

European Office Action for Application No. EP 03 02 7844, dated Jul. 4, 2006.

L. Rau et al., "All-Optical Add-Drop of an OTDM Channel Using an Ultrafast Fiber Based on Wavelength Converter", Optical Fiber Comm. Conf. and Exhibit, Technical Digest, Postconference; Trends in Optics and Photonics Series, vol. 70, pp. 259-261, OFC-2002.

European Search Report for Application No. EP 03 02 7844, mailed Mar. 9, 2006.

Japanese Patent Office Action, mailed Jan. 23, 2007, and issued in corresponding Japanese Patent Application No. 2002-355681.

* cited by examiner

OPTICAL TIME-DIVISION DEMULTIPLEXING APPARATUS

BACKGROUND OF THE INVENTION

1. Field of the Invention

The present invention relates to an optical demultiplexing (DEMUX) apparatus for extracting a signal light of a reference rate, which configures a signal light multiplexed with electrical time-division multiplexing or optical time-division multiplexing (ETDM or OTDM).

2. Description of the Related Art

ETDM/OTDM are the promising multiplexing technologies for speeding up an optical network, and for increasing a capacity in terms of an implementation of an ultra-fast optical network in the future. Wavelength division multiplexing (WDM) is the most suitable multiplexing technology for a long-haul transmission. However, since an optical carrier of wavelengths the number of which is equal to the number of channels is required, configuration of an optical network becomes complex. Although the bit rate of an ETDM/OTDM signal becomes high at times equal to the number of channels, it can be transmitted over single optical carrier of a single wavelength. Its transmission distance is limited in correspondence with an increase in the bit rate. However, if such a signal is used for a short-distance transmission or for signal processing within an optical node of an optical network, a configuration can be significantly reduced due to its single wavelength in comparison with the case where WDM is used. Additionally, in the processing executed within an optical node, optical switching in a time regime can be used. Therefore, a switching speed can be improved on the order of $10^6$ to $10^7$ times in comparison with the case where a wavelength switch is used.

One of the major problems when an ETDM/OTDM signal is used is demultiplexing.

For example, an OTDM signal of 160 Gbit/s is multiplexed with a short pulse having a full width at falf maximum (FWHM) equal to or smaller than about 2 ps or so while timing is shifted at an interval of 6.25 ps for each channel. To demultiplex a signal of 10 or 40 Gbits/s signal, which is a reference rate, from such an OTDM signal of 160 Gbits/s, an optical switch which has a high-speed operation characteristic of order of picoseconds or smaller, whose extraction time interval (Window) is sufficiently shorter than 6.25 ps, and which can sufficiently eliminate adjacent channels is required. Such high-speed optical demultiplexing is difficult to be made electrically because of restrictions on the operation speed of electronics. An optical gate of a Mach-Zehnder interferometer type, an optical switch using four-wave mixing or an optical chirp, a configuration where Ea modulators are connected in series, etc. have been proposed and studied so far.

With an optical demultiplexing circuit using an optical AND circuit adopting a nonlinear effect, a channel is demultiplexed by a control light pulse as indicated by Japanese Patent Application Publication No. 8-195732. Even with this circuit, an optical pulse after being demultiplexed includes much cross talk depending on the value of a half value width of the control light pulse.

Additionally, Japanese Patent Application Publication No. 2001-27769 recites a configuration using an optical switch. Also in this case, an optical pulse after being demultiplexed includes cross talk depending on the value of a half value width of a control light pulse.

As described above, with conventional various optical demultiplexing apparatuses, a control light composed of optical pulses having a narrow pulse width is interacted with a signal light, and only a necessary optical pulse is extracted. However, the S/N ratio of the extracted optical pulse depends on the degree of the narrowness of the width of the optical pulse of the control light. Namely, unless the FWHM of the optical pulse of the control light is sufficiently small, some optical pulses adjacent to a target optical pulse are also extracted together when the particular optical pulse is extracted from a signal light having a very high bit rate in the future. This causes noise to the target optical pulse. As the bit rate of a signal light increases, the pulse width of the optical pulse of the signal light decreases. Therefore, also the FWHM of the optical pulse of control light must become smaller in correspondence with this phenomenon. Actually, however, it is difficult to generate an optical pulse of control light having such a small pulse width, and accordingly, an apparatus for generating such an optical pulse becomes complex and expensive.

SUMMARY OF THE INVENTION

An object of the present invention is to provide an apparatus for implementing optical time-division demultiplexing for a high-speed ETDM/OTDM signal with simple and stable high performance.

An optical time-division demultiplexing apparatus according to the present invention is an optical time-division demultiplexing apparatus extracting an optical pulse of a predetermined interval from a signal light composed of optical pulses. This apparatus comprises: an intensity modulating unit intensity-modulating the signal light by using the predetermined interval as a cycle so that a peak matches an optical pulse desired to be extracted; a spectrum expanding unit expanding a spectrum of the intensity-modulated signal light to be broader as the peak of the optical pulse is larger; and an extracting unit extracting the expanded spectrum of the optical pulse desired to be extracted in a position where an expanded spectrum of a different optical pulse does not reach.

According to the present invention, an optical pulse of a particular channel transmitted in predetermined cycles can be accurately demultiplexed from an optically time-division multiplexed signal light. Especially, when a spectrum of signal light is expanded, the ratio at which the spectrum expands is made to depend on the intensity of the peak of an optical pulse. Therefore, by extracting the spectrum of a demultiplexed optical pulse in a position where a spectrum of an optical pulse desired not to be demultiplexed does not reach, some of optical pulses of different channels are not mixed up as noise at the time of demultiplexing. As a result, demultiplexing having good selectivity can be performed.

DESCRIPTION OF THE PREFERRED EMBODIMENTS

Preferred embodiments according to the present invention comprise the following functions.

(1) Amplitude-modulating a signal light with a repetitive signal of a reference frequency (10 GHz in the case of optical demultiplexing into 10 Gbit/s) for optical demultiplexing. At that time, matching the timing of the modulation signal with the pulse of a channel to be optically demultiplexed, and setting the amplitude of the channel to be optically demultiplexed to be larger than any other pulses. If possible, it is desirable that the peak power of an adjacent channel becomes almost half or lower than the peak power of the amplitude of the channel to be optically demultiplexed.

(2) After power-amplifying the amplitude-modulated signal light with an optical amplifier, inputting the signal light to an optical fiber, expanding its spectrum with self-phase modulation (SPM) that occurs within the fiber (generating a spectrum called supercontinuum), and extracting a component different from a central wavelength from the spectrum with an optical band pass filter (optical BPF), thereby improving the suppression efficiency of adjacent and other channels.

With the above described method, ultra-fast and satisfactory optical demultiplexing can be implemented.

Figure 1:
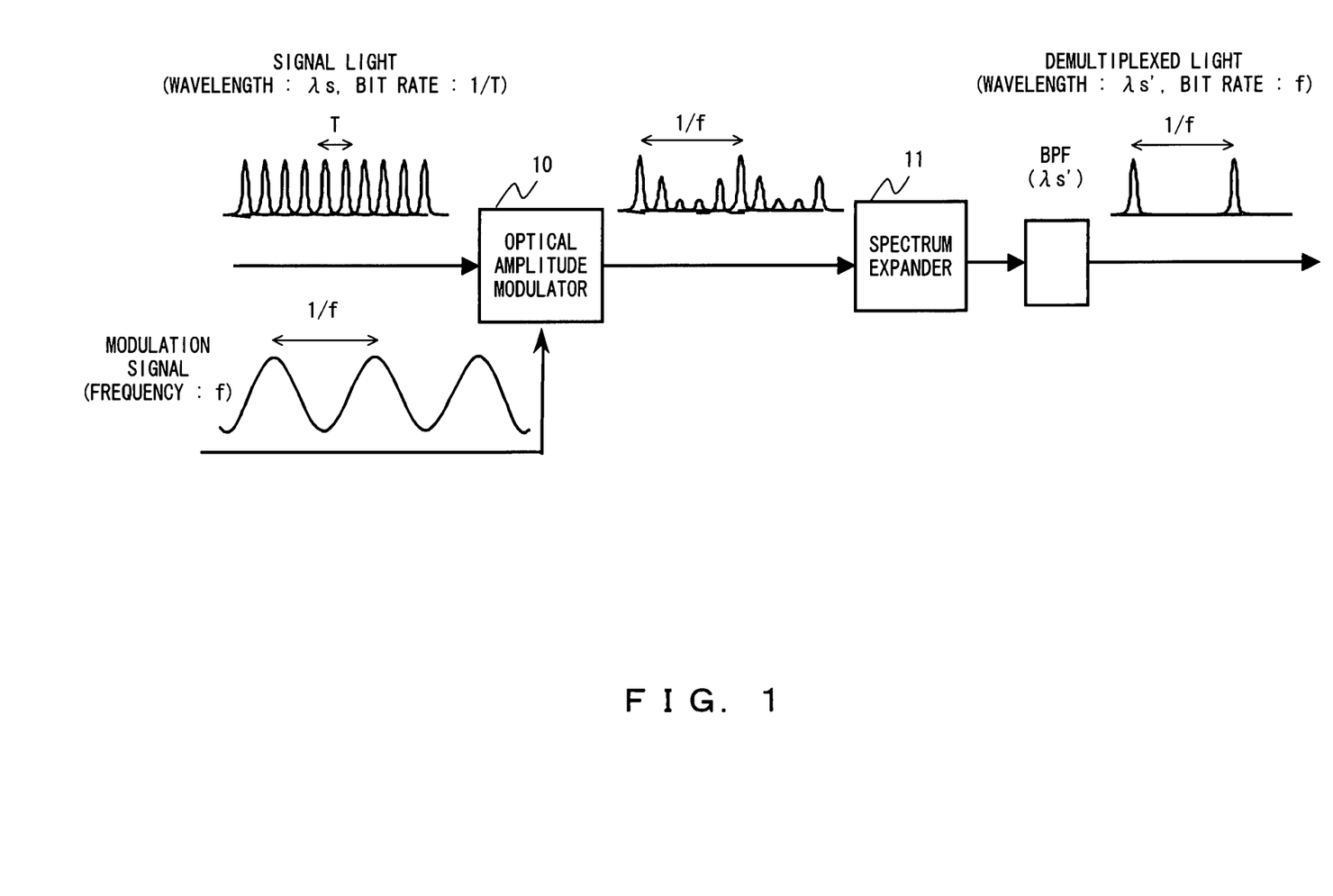
FIG. 1 shows the basic configuration of a preferred embodiment according to the present invention.

FIG. 1 shows the basic configuration of a preferred embodiment.

Optical amplitude (intensity) modulation using a repetitive frequency f (f<1/T, and typically, f is a submultiple frequency of 1/T) is performed for a signal light having a wavelength $\lambda s$ and a bit rate 1/T with an optical amplitude modulator (optical intensity modulator) 10. At this time, an adjustment is made so that the peak of the amplitude (intensity) of the modulation signal matches the timing of the peak of a pulse to be optically demultiplexed. The modulated signal light becomes an optical pulse sequence having a peak at time intervals of 1/f. Next, the spectrum of this modulated signal light is expanded with a spectrum expander 11 (supercontinuum is generated), and a component the wavelength of which is shifted is extracted with an optical BPF having a central wavelength $\lambda s'$ ($\lambda s' \neq \lambda s$). As a result, remaining adjacent pulse components can be suppressed, and optical demultiplexing is completed.

As the above described optical amplitude modulation method, every optical intensity modulation method such as a method performing modulation with an electric signal of a repetitive frequency f by using an electro-absorption (EA) modulator or a LiNbO$_3$ modulator, a method using an optical clock pulse of a repetitive frequency f as a pump light of four-wave mixing (FWM) or a control light of cross-phase modulation (XPM), or the like is applicable. In the meantime, as the method expanding the spectrum of a modulated signal light, a method using a chirp that occurs within a third-order nonlinear optical medium is effective.

Figure 2:
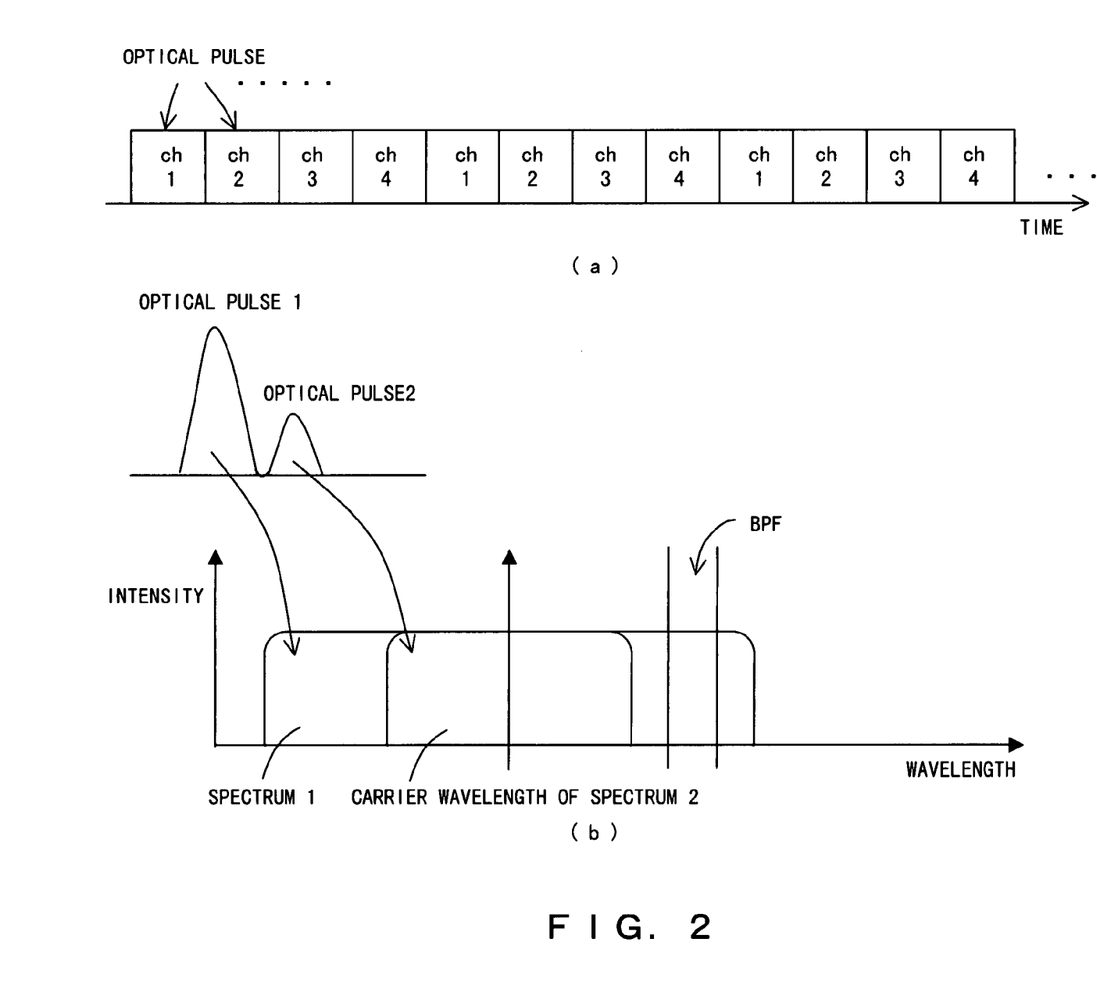
FIG. 2 explains the principle of the preferred embodiment.

FIG. 2 explains the principle of the preferred embodiment.

A signal light multiplexed with ETDM/OTDM have a configuration where optical pulses of respective channels are repeatedly arranged in order in a time direction as shown in FIG. 2A. FIG. 2A shows the case where the number of channels is 4. Although the number of channels actually depends on a system, an explanation is provided by taking the case of 4 channels as an example. The first 4 pulses at the beginning of the optical pulse sequence are the pulses of the channels 1 to 4 respectively. Following these pulses, the second optical pulses of the channels 1 to 4 are respectively arranged. In this case, if attempts are made to extract an optical pulse of a particular channel from the optical pulse sequence arranged in the time direction, the optical pulse must be extracted at the right timing once for every 4 pulses.

Accordingly, as described above, amplitude modulation in 4-pulse cycles is performed for the optical pulse sequence having the configuration shown in FIG. 2A with an optical amplitude modulator. At this time, setting is made so that the peak of the amplitude modulation matches that of the optical pulse of the channel desired to be extracted.

As a result, the signal light undergoes the above described optical amplitude modulation, so that it becomes an optical pulse sequence where the optical pulse of the channel desired to be extracted is the largest pulse peak. Next, an expanded spectrum, which indicates the spectrum expansion that depends on the height of the peak of the optical pulse, is generated with a third-order nonlinear effect, etc. FIG. 2B shows the relationship between the optical pulses and the spectra when such a spectrum expansion is made.

In FIG. 2B, the peak of the pulse 1 is larger than that of the pulse 2. The spectra generated in correspondence are indicated as spectra 1 and 2 that respectively correspond to the pulses 1 and 2. As described above, a spectrum expansion method with which a spectrum is expanded to be narrow for a pulse having a small peak, and a spectrum is expanded to be broad for a pulse having a large peak is used. Supercontinuum generation using the third-order nonlinear effect is one example of such a spectrum expansion method.

As is evident from FIG. 2B, the spectrum 1 of the pulse 1 extends off the spectrum 2 of the pulse 2 outward. Therefore, a band pass filter (BPF) is provided in this portion to make only the light of the spectrum 1 pass through, whereby only the light of the pulse 1, from which part of the signal of the pulse 2 is completely eliminated, can be extracted. However, an optical pulse having a central wavelength that is different from the carrier wavelength of the pulse 1 is obtained as an extracted pulse corresponding to the pulse 1.

Figure 3:
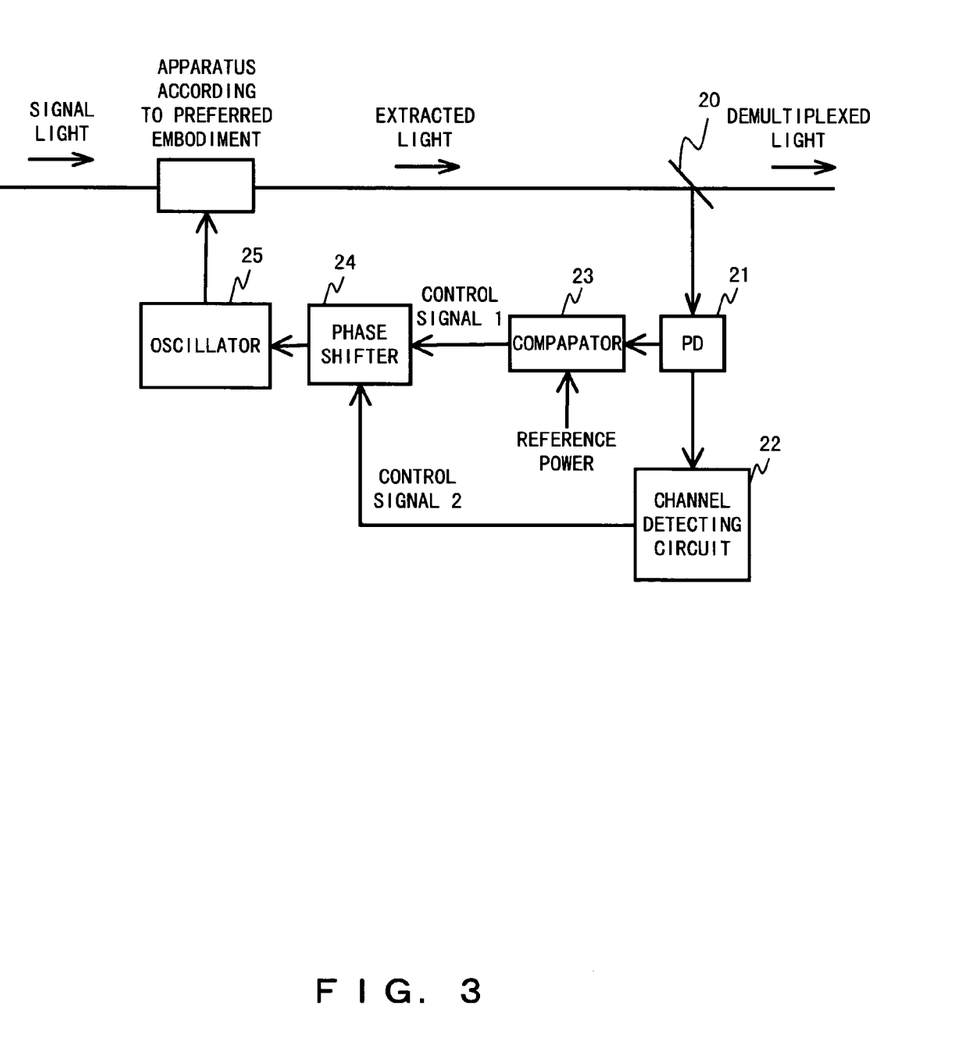
FIG. 3 shows a configuration for matching the timing of the peak of a modulation signal with a pulse to be optically demultiplexed.

FIG. 3 shows a configuration for matching the timing of the peak of a modulation signal with a pulse to be optically demultiplexed.

Part of light extracted with the apparatus according to the preferred embodiment of the present invention is branched with a coupler 20, and converted into an electric signal with a photodiode (PD 21). Since the extracted light is a signal after being demultiplexed at this time, its speed is reduced to the bit rate of one channel. Even if a photodiode (PD), etc. is used, the reaction speed of the PD can catch up with this signal. Therefore, the signal can be sufficiently received.

This electric signal is received by a comparator 23, which compares the signal with reference power. Then, a phase shifter 24 is controlled with a control signal 1 so that the phase (timing) of the signal of the reference frequency for optical demultiplexing, which is oscillated by an oscillator 25, is shifted until the reference is satisfied. In the meantime, the signal received by the PD 21 is input to a channel detection circuit 22, which determines whether or not a correct channel is extracted from this signal. If the correct channel is not extracted, the phase of the signal of the reference frequency for the optical demultiplexing is shifted by required time slots with a control signal 2 with the use of the phase shifter 24. To detect a channel, a signal for recognizing the channel may be put on a data signal of each channel. A method putting such a signal on the initial few bits of data, or the like is applicable.

Figure 4:
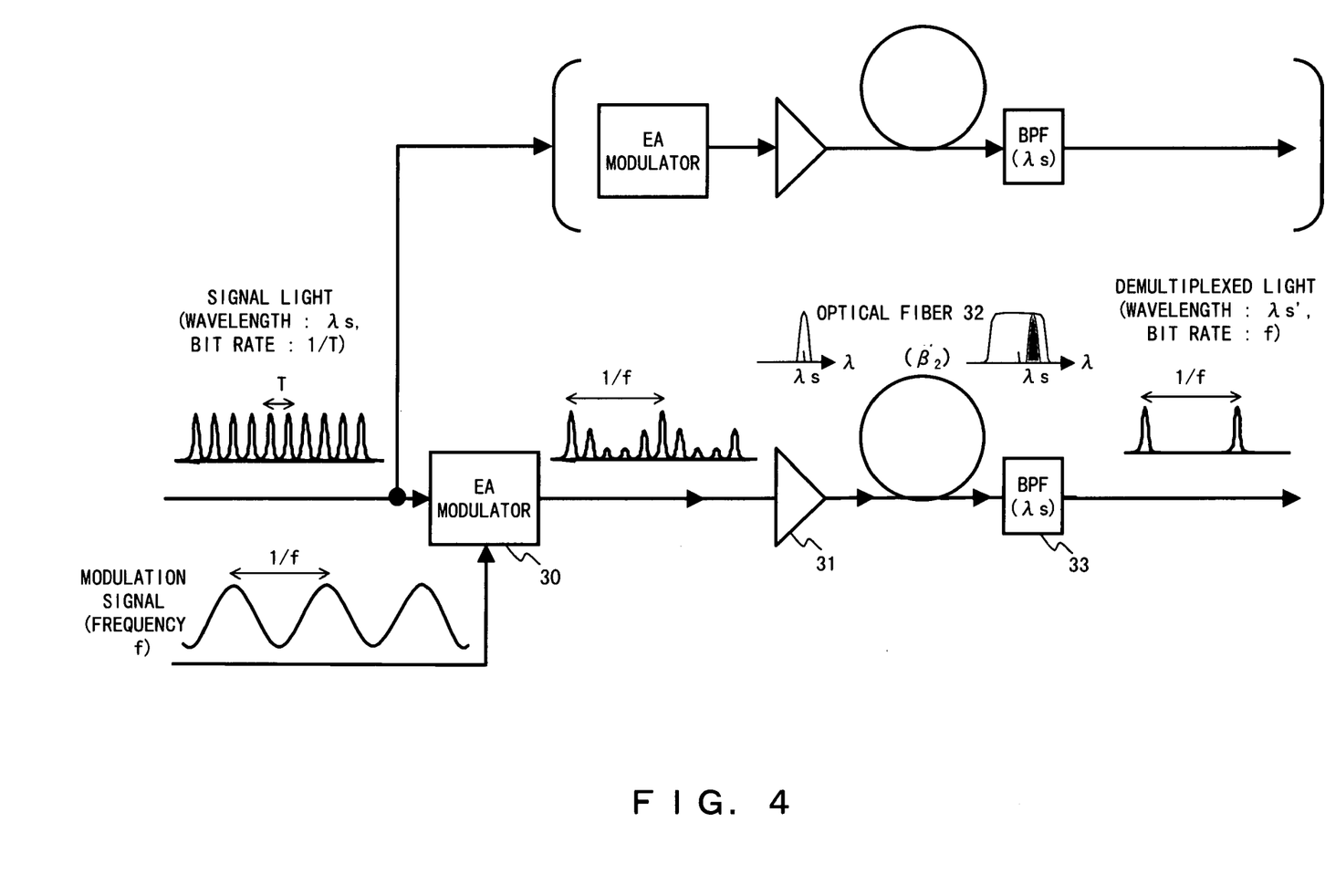
FIG. 4 shows a preferred embodiment implemented in the case where an EA modulator is used as an optical amplitude modulator, a modulated signal light is input to an optical fiber, and a spectrum is expanded with SPM that occurs within the optical fiber.

FIG. 4 shows a preferred embodiment implemented in the case where an EA modulator is used as an optical amplitude modulator, a modulated signal light is input to an optical fiber, and spectrum expansion using SPM that occurs within the optical fiber is used.

In FIG. 4, a signal light is input to an EA modulator 30, and modulated with a modulation signal. At this time, the signal light after being modulated undergoes modulation such that the peak of the optical pulse of a channel to be extracted becomes the largest. The signal light after being modulated is amplified by an optical amplifier 31, and passes through an optical fiber 32, which is a medium indicating the third-order nonlinear effect, so that the spectrum of the signal light is expanded. Then, an optical pulse of a particular channel is extracted by a band pass filter (BPF) 33 as described with reference to FIG. 2. If a plurality of channels are extracted, signal light is branched prior to the EA modulator 30, and channels desired to be extracted are extracted with a configuration similar to the above described one.

When an optical pulse is input to a third-order nonlinear medium, chirping by SPM or XPM occurs, and a spectrum is expanded. In FIG. 4, the modulated signal is input to the optical fiber having group velocity dispersion of $\beta_2$, and its spectrum is expanded with SPM by an ON pulse. Next, a component having a central wavelength $\lambda s'$ different from the signal light is extracted with the BPF. With this method, the expansion of a spectrum is proportional to the peak intensity of each optical pulse. Therefore, remaining adjacent pulses can be suppressed as described above. Additionally, even if the shape of an extracted pulse is distorted (amplitude fluctuation or amplitude noise) due to a transmission, etc., the intensity of the spectrum is constant within a range where a chirp occurs. Therefore, the amplitude fluctuation can be suppressed. Namely, waveform shaping can be made. For details of these functions, see Japanese Patent Application No. 2001-2745, Japanese Patent Application No. 2000-264757 (Japanese Patent Application Publication No. 2002-77052), and Japanese Patent Application No. 2001-301952, which are already filed.

To implement these preferred embodiments, an optical fiber having an enhanced nonlinear effect, such as a highly nonlinear optical fiber, a photonic crystal fiber, a Holey fiber, etc., which are recited in the already filed patent applications, is effective as an optical fiber. For dispersion $\beta_2$ of an optical fiber when dispersion is normal ($\beta_2>0$), when dispersion is flat ($\beta_2$=constant), or when dispersion is reduced, which gives a condition of soliton adiabatic compression, is usable and optical fibers indicating these characteristics are applicable. Here, normal dispersion is cited as a preferable example. The reason why anomalous dispersion is not preferable is that if a fiber of normal dispersion is used to expand the spectrum of signal light, the spectrum is expanded to be rectangular while its value is kept high. In the meantime, if a fiber of anomalous dispersion is used, the spectrum is expanded very much, but its intensity becomes small, leading to degradation in the S/N ratio of a signal extracted from the expanded spectrum.

Figure 5:
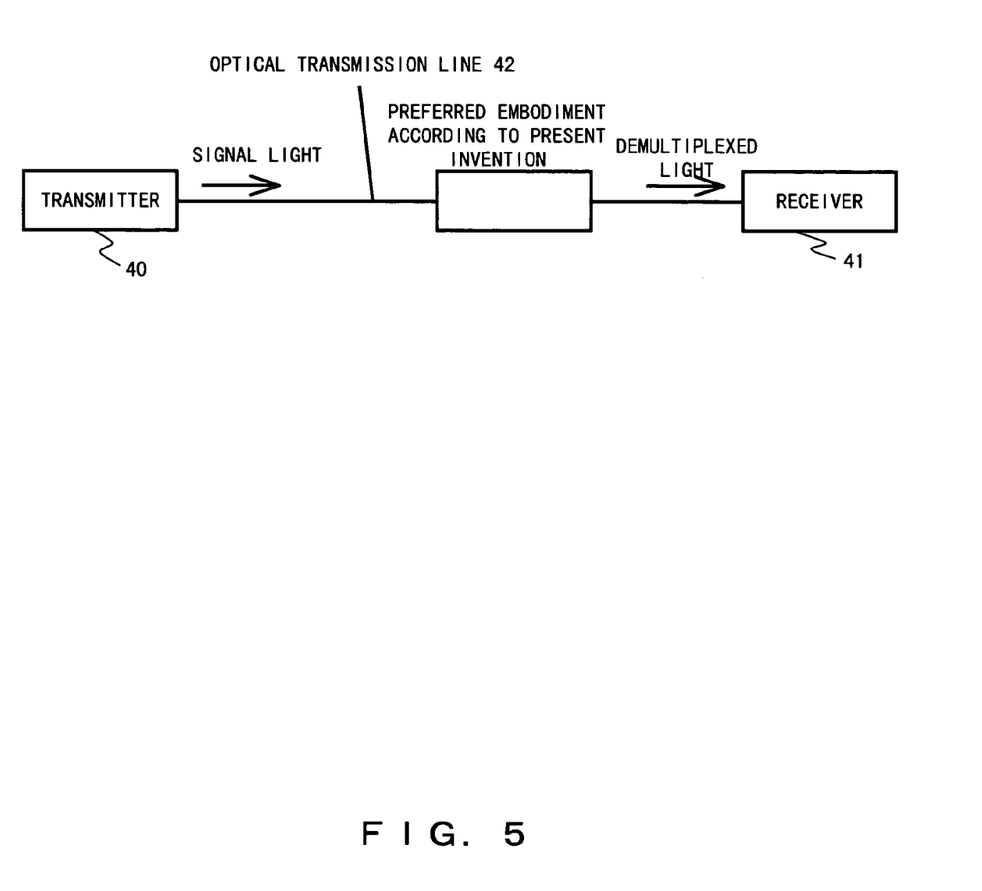
FIG. 5 shows a configuration example where the preferred embodiment according to the present invention is applied to an optical communications system.

FIG. 5 shows a configuration example where the preferred embodiment according to the present invention is applied to an optical communications system.

After a signal light output from a transmitter 40 is transmitted over an optical transmission line 42, and optically demultiplexed according to the preferred embodiment of the present invention, it is received by a receiver 41. Needless to say, an optical amplification relay transmission using an optical amplifier is applicable to the transmission made over the optical transmission line 42 configured by an optical fiber.

Figure 6:
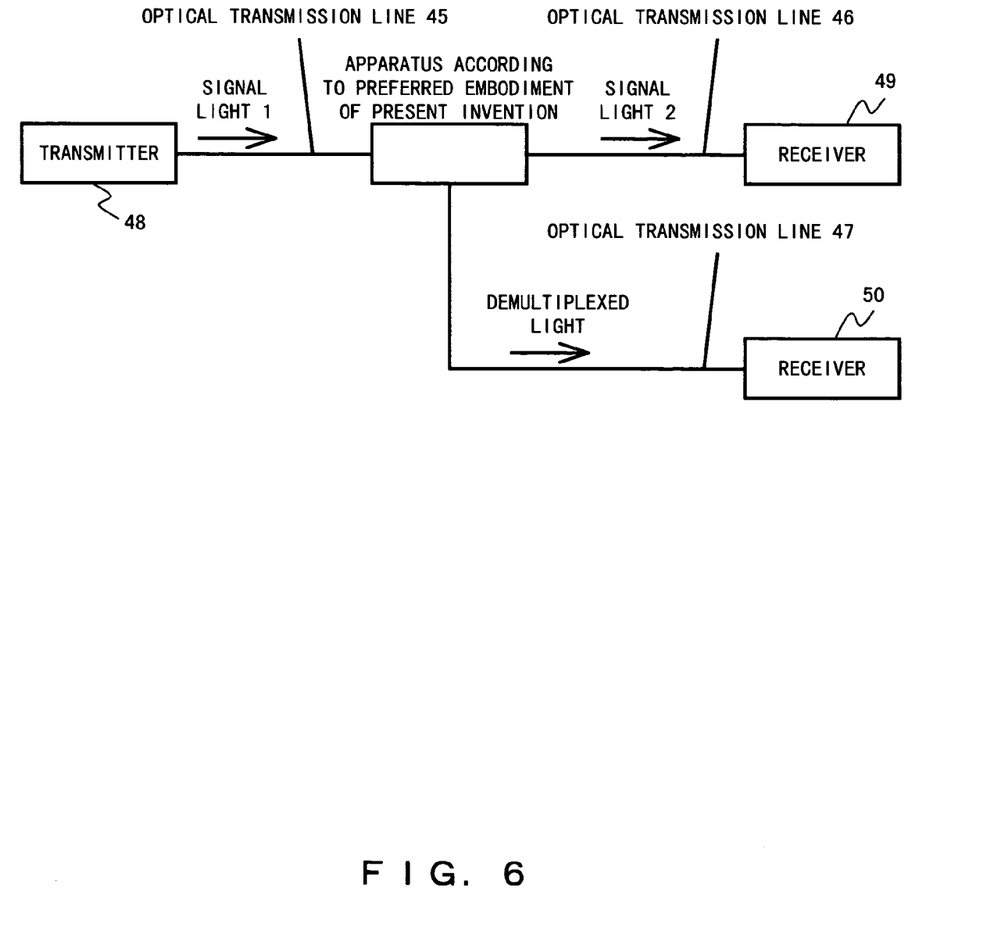
FIG. 6 shows a configuration example where the preferred embodiment according to the present invention is applied to an optical ADD/DROP circuit in an optical node.

FIG. 6 shows a configuration example where the preferred embodiment according to the present invention is applied to an optical ADD/DROP circuit in an optical node.

A desired channel is optically demultiplexed from a signal light 1 that is output from a transmitter 48 and transmitted over an optical transmission line 45 in an optical node configured by the apparatus according to the preferred embodiment of the present invention. After the demultiplexed light is transmitted over an optical transmission line 47, it is received by a receiver 50. In the meantime, the original signal light 2 that is not demultiplexed is received by a receiver 49 after being transmitted over an optical transmission line 46. Note that the signal light 2 can be also a signal light resultant from optically adding a channel that is not included in the signal light 1 in the optical node.

The case where the core of an optical fiber is doped with germanium, etc. in order to obtain a third-order nonlinear medium is described next.

To efficiently generate a chirp by SPM, it is effective to increase the $\gamma$ value of an optical fiber.

$\gamma$ of an optical fiber is represented as follows.

$$\gamma = \frac{\omega n_2}{c A_{\mathit{eff}}} \quad (1)$$

where $\omega$, c, $n_2$, and $A_{\mathit{eff}}$ respectively indicate an optical angular frequency, the velocity of light in a vacuum, a nonlinear refractive index of the optical fiber, and an effective core area of the optical fiber. To generate a sufficiently large chirp with a short fiber, it is effective that $n_2$ is increased in the equation (1), or a mode field diameter (MFD) is decreased, namely, $A_{\mathit{eff}}$ is decreased to improve the optical intensity per unit sectional area. As a means for increasing $n_2$, there are methods such as a method doping a clad with fluorine, etc. and doping a core with a relatively high concentration of $GeO_2$, etc. A large $n_2$ value of $5\times10^{-20}$ $m^2/W$ or more is obtained when the doping concentration of $GeO_2$ is 25 to 30 mol % ($n_2$ is $3.2\times10^{-20}$ $m^2/W$ for a normal silica fiber). In the meantime, for a decrease in the MFD, an MFD on the order of 4 μm is obtained when the specific refractive index difference $\Delta$ between a core and a clad is on the order of 2.5 to 3%. As a total effect of these effects, a fiber having a large $\gamma$ value of 15 to 20 $W^{-1}$ $km^{-1}$ or more is obtained.

Additionally, to effectively generate SPM, chromatic dispersion of such a fiber must be managed with high accuracy. Also in this point, the management can be made by setting the above described parameters as follows. Firstly, a dispersion value normally becomes large in a normal dispersion area if $\Delta$ is increased under a condition where an MFD is made constant in a normal DCF (Dispersion Compensating Fiber). In the meantime, if the core diameter is increased, the dispersion decreases. Or, if the core diameter is decreased, the dispersion increases. Accordingly, the dispersion can be reduced to 0 by increasing the core diameter in the state where the MFD is set to a certain value in a wavelength band used. Inversely, also a desired normal dispersion fiber can be obtained.

With such a method, a highly nonlinear dispersion shifted fiber (HNL-DSF) or a DCF, whose $\gamma$ value is equal to or larger than 15 $W^{-1} km^{-1}$, is implemented.

Furthermore, as a method enhancing a nonlinear effect, a method using a photonic crystal fiber or a Holey fiber is also proposed and discussed. Since the degree of freedom of designing the mode or the dispersion of an optical fiber having these structures is increased, an MFD can be further reduced. With the structure of a Holey fiber using soft glass (SF57) within a core, a γ value as large as 550 $W^{-1}$ $km^{-1}$ is implemented.

As described above, according to the present invention, an apparatus for implementing ultra-fast optical demultiplexing having sufficient channel selectivity can be provided.

What is claimed is:

1. An optical time-division demultiplexing apparatus extracting an optical pulse of a predetermined interval from a signal light composed of optical pulses, comprising:
   an intensity modulating unit intensity-modulating the signal light with an electrical signal having a submultiple of a bit rate of the signal light;
   a spectrum expanding unit expanding spectrums of optical pulses in the intensity-modulated signal light so that, for a respective optical pulse, the spectrum is broader as an intensity of the respective optical pulse is higher; and
   an extracting unit extracting the expanded spectrum of an optical pulse desired to be extracted in a position where an expanded spectrum of a different optical pulse does not reach.

2. The optical time-division demultiplexing apparatus according to claim 1, wherein
   said extracting unit is a band pass filter.

3. The optical time-division demultiplexing apparatus according to claim 1, wherein
   the cycle is a submultiple of a bit rate of an optical pulse of the signal light.

4. The optical time-division demultiplexing apparatus according to claim 1, wherein
   said intensity modulating unit is an electro-absorption modulator.

5. The optical time-division demultiplexing apparatus according to claim 1, wherein
   said spectrum expanding unit is a unit using self-phase modulation that occurs within an optical fiber.

6. The optical time-division demultiplexing apparatus according to claim 1, wherein
   said spectrum expanding unit expands a spectrum by inputting to a normal dispersion fiber an optical pulse having a peak power as high as generating a nonlinear effect.

7. The optical time-division demultiplexing apparatus according to claim 1, wherein
   an optical fiber whose core is doped with germanium, and whose specific refractive index of the core to a clad is controlled is used as said spectrum expanding unit.

8. The optical time-division demultiplexing apparatus according to claim 1, wherein
   a photonic crystal fiber or a Holey fiber is used as said spectrum expanding unit.

9. A time-division demultiplexing method for use in an optical time-division demultiplexing apparatus extracting an optical pulse of a predetermined interval from a signal light composed of optical pulses, comprising:
   intensity-modulating the signal light with an electrical signal having a submultiple of a bit rate of the signal light;
   expanding spectrums of optical pulses in the intensity-modulated signal light so that, for a respective optical pulse, the spectrum is broader as an intensity of the respective optical pulse is higher; and
   extracting the expanded spectrum of an optical pulse desired to be extracted in a position where an expanded spectrum of a different optical pulse does not reach.

10. The optical time-division demultiplexing method according to claim 9, wherein
    said intensity-modulation is performed by using an electro-absorption modulator.

11. The optical time-division demultiplexing method according to claim 9, wherein
    said expansion spectrums is peformed by using self-phase modulation that occurs within an optical fiber.

12. The time-division demultiplexing method according to claim 9, wherein
    said expansion spectrum is performed by inputting to a normal dispersion fiber an optical pulse having a peak power as high as generating a nonlinear effect.

13. The optical time-division demultiplexing method according to claim 9, wherein
    an optical fiber whose core is doped with germanium, and whose specific refractive index of the core to a clad is controlled is used in said expanding spectrums.

14. The optical time-division demultiplexing method according to claim 9, wherein
    a photonic crystal fiber or a Holey fiber is used in said expanding spectrums.

15. The optical time-division demultiplexing method according to claim 9, wherein
    a band pass filter is used in said extracting.

16. An apparatus, comprising:
    an intensity-modulating unit intensity modulating a signal light comprising a plurality of optical pulses with an electrical signal having a submultiple of a bit rate of the signal light;
    a spectrum expanding unit expanding spectrums of optical pulses in the intensity-modulated signal light so that, for a respective optical pulse, the spectrum is broader as an intensity of the respective optical pulse is higher; and
    an extractor extracting the expanded spectrum of an optical pulse desired to be extracted in a position where an expanded spectrum of a different optical pulse does not reach.

17. An apparatus, comprising:
    intensity-modulating means for intensity modulating a signal light comprising a plurality of optical pulses with an electric signal having a submultiple of a bit rate of the signal light;
    spectrum expanding means for expanding spectrums of optical pulses in the intensity-modulated signal light so that, for a respective optical pulse, the spectrum is broader as an intensity of the respective optical pulse is higher; and
    extractor means for extracting the expanded spectrum of an optical pulse desired to be extracted in a position where an expanded spectrum of a different optical pulse does not reach.

18. An apparatus comprising:
    an intensity-modulating unit intensity modulating a signal light comprising a plurality of optical pulses with an electrical signal having a submultiple of a bit rate of the signal light;
    a spectrum expanding unit expanding spectrums of optical pulses in the intensity-modulated signal light so that, for a respective optical pulse, the spectrum is broader as an intensity of the respective optical pulse is higher;
    an extractor extracting the expanded spectrum of an optical pulse desired to be extracted in a position where an expanded spectrum of a different optical pulse does not reach;
    an oscillator oscillating the electrical signal using a phase shifter, and providing the electrical signal to the intensity-modulating unit for modulating the signal light; and
    a channel detection circuit controlling the phase shifter so as to correctly detect a time slot from light of the extracted spectrum.

* * * * *

UNITED STATES PATENT AND TRADEMARK OFFICE
CERTIFICATE OF CORRECTION

PATENT NO. : 7,587,140 B2
APPLICATION NO. : 10/724724
DATED : September 8, 2009
INVENTOR(S) : Shigeki Watanabe It is certified that error appears in the above-identified patent and that said Letters Patent is hereby corrected as shown below:

Column 7, Line 66, change "intensity-modulation" to --intensity-modulating--.

Column 8, Line 3, change "expansion spectrums is performed" to --expanding spectrums is performed--.

Column 8, Line 7, change "said expansion spectrum" to --said expanding spectrums--.

Signed and Sealed this

Twenty-fourth Day of November, 2009

David J. Kappos
*Director of the United States Patent and Trademark Office*